(12) United States Patent
Berthold (10) Patent No.: US 7,864,329 B2
(45) Date of Patent: Jan. 4, 2011

(54) FIBER OPTIC SENSOR SYSTEM HAVING CIRCULATORS, BRAGG GRATINGS AND COUPLERS

(75) Inventor: John W. Berthold, Salem, OH (US)

(73) Assignee: Halliburton Energy Services, Inc., Duncan, OK (US)

( * ) Notice: Subject to any disclaimer, the term of this patent is extended or adjusted under 35 U.S.C. 154(b) by 64 days.

(21) Appl. No.: 11/314,714

(22) Filed: Dec. 21, 2005

(65) Prior Publication Data

US 2006/0139652 A1 Jun. 29, 2006

Related U.S. Application Data

(60) Provisional application No. 60/637,966, filed on Dec. 21, 2004.

(51) Int. Cl.
*G01B 9/02* (2006.01)
(52) U.S. Cl. ....................................... 356/478; 356/480
(58) Field of Classification Search ................. 356/478, 356/480
See application file for complete search history.

(56) References Cited

U.S. PATENT DOCUMENTS

| | | | |
|---|---|---|---|
| 1,432,149 A | 10/1922 | Bellingham | |
| 3,923,400 A | 12/1975 | Hardy | |
| 4,210,029 A | 7/1980 | Porter | |
| 4,329,058 A | 5/1982 | James et al. | |
| 4,393,714 A | 7/1983 | Schmidt | |
| 4,418,981 A | 12/1983 | Stowe | |
| 4,428,239 A | 1/1984 | Johnston | |
| 4,572,669 A | 2/1986 | James et al. | |
| 4,576,479 A | 3/1986 | Downs | |
| 4,583,228 A | 4/1986 | Brown et al. | |
| 4,596,466 A | 6/1986 | Ulrich | |
| 4,606,638 A | 8/1986 | Sommargren | |
| 4,628,211 A | 12/1986 | Ruppert | |
| 4,640,616 A | 2/1987 | Michalik | |
| 4,647,203 A | 3/1987 | Jones et al. | |
| 4,648,083 A * | 3/1987 | Giallorenzi | 367/149 |

(Continued)

FOREIGN PATENT DOCUMENTS

DE 3127333 1/1983

(Continued)

OTHER PUBLICATIONS

Tseng et al, Polymer MEMS-based Fabry-Perot Shear Sensor, IEEE Sensors Journal, vol. 3, No. 6, Dec. 2003, pp. 812-817.*

(Continued)

*Primary Examiner*—Michael A Lyons
(74) *Attorney, Agent, or Firm*—John W. Wustenberg; Booth, Albanesi, Schroede LLC (57) ABSTRACT

A method and apparatus for detecting seismic vibrations using a series of MEMS units, with each MEMS unit including an interferometer is described. The interferometers on the MEMS units receive and modulate light from two differing wavelengths by way of a multiplexing scheme involving the use of Bragg gratings and light circulators, and an optoelectronic processor receives and processes the modulated light to discern vibrational movement of the system, which in turn allows for monitoring and calculation of a specified environmental parameter, such as seismic activity, temperature or pressure.

20 Claims, 3 Drawing Sheets

U.S. PATENT DOCUMENTS

| | | | |
|---|---|---|---|
| 4,668,889 A | 5/1987 | Adams | |
| 4,678,909 A | 7/1987 | Jackson et al. | |
| 4,682,500 A | 7/1987 | Uda | |
| 4,729,654 A | 3/1988 | Akuta et al. | |
| 4,755,668 A | 7/1988 | Davis | |
| 4,772,786 A | 9/1988 | Langdon | |
| 4,777,358 A | 10/1988 | Nelson | |
| 4,787,741 A | 11/1988 | Udd et al. | |
| 4,806,016 A | 2/1989 | Corpron et al. | |
| 4,844,616 A | 7/1989 | Kulkarni et al. | |
| 4,873,989 A | 10/1989 | Einzig | |
| 4,907,035 A | 3/1990 | Galburt et al. | |
| 4,914,666 A | 4/1990 | Glance | |
| 4,968,144 A | 11/1990 | Thomas et al. | |
| 4,972,077 A | 11/1990 | Willson et al. | |
| 4,995,697 A | 2/1991 | Adamovsky | |
| 5,034,603 A | 7/1991 | Wilson | |
| 5,089,696 A | 2/1992 | Turpin | |
| 5,094,534 A | 3/1992 | Cole et al. | |
| 5,119,024 A | 6/1992 | Popovic et al. | |
| 5,128,537 A | 7/1992 | Halg | |
| 5,128,798 A | 7/1992 | Bowen et al. | |
| 5,148,604 A | 9/1992 | Bantien | |
| 5,177,805 A | 1/1993 | Groger et al. | |
| 5,187,546 A | 2/1993 | Johnston | |
| 5,202,939 A * | 4/1993 | Belleville et al. | 356/480 |
| 5,202,969 A | 4/1993 | Sato | |
| 5,218,418 A | 6/1993 | Layton | |
| 5,218,426 A | 6/1993 | Hall et al. | |
| 5,225,888 A | 7/1993 | Selwyn et al. | |
| 5,239,400 A | 8/1993 | Liu | |
| 5,247,597 A | 9/1993 | Blacha et al. | |
| 5,276,501 A | 1/1994 | McClintock et al. | |
| 5,283,625 A | 2/1994 | Bunn, Jr. | |
| 5,319,981 A | 6/1994 | Mei et al. | |
| 5,351,317 A | 9/1994 | Weber | |
| 5,361,130 A | 11/1994 | Kersey et al. | |
| 5,386,729 A | 2/1995 | Reed et al. | |
| 5,392,117 A | 2/1995 | Belleville et al. | |
| 5,400,140 A | 3/1995 | Johnston | |
| 5,401,956 A | 3/1995 | Dunphy et al. | |
| 5,401,958 A | 3/1995 | Berkcan | |
| 5,420,688 A * | 5/1995 | Farah | 356/480 |
| 5,444,724 A | 8/1995 | Goto | |
| 5,451,772 A | 9/1995 | Narendran | |
| 5,471,428 A | 11/1995 | Baroni et al. | |
| 5,477,323 A | 12/1995 | Andrews et al. | |
| 5,497,233 A | 3/1996 | Meyer | |
| 5,509,023 A | 4/1996 | Glance et al. | |
| 5,526,114 A | 6/1996 | Eselun | |
| 5,550,373 A | 8/1996 | Cole et al. | |
| 5,557,406 A | 9/1996 | Taylor et al. | |
| 5,559,358 A * | 9/1996 | Burns et al. | 257/431 |
| 5,631,736 A | 5/1997 | Thiel et al. | |
| 5,641,956 A | 6/1997 | Vengsarkar et al. | |
| 5,646,762 A | 7/1997 | Delavaux et al. | |
| 5,647,030 A | 7/1997 | Jorgenson et al. | |
| 5,657,405 A | 8/1997 | Fujiwara | |
| 5,682,237 A | 10/1997 | Belk | |
| 5,739,945 A | 4/1998 | Tayebati | |
| 5,760,391 A | 6/1998 | Narendran | |
| 5,784,507 A | 7/1998 | Holm-Kennedy et al. | |
| 5,796,007 A | 8/1998 | Panagotopulos et al. | |
| 5,818,586 A | 10/1998 | Lehto et al. | |
| 5,835,214 A | 11/1998 | Cabib et al. | |
| 5,835,645 A | 11/1998 | Jorgenson et al. | |
| 5,847,828 A | 12/1998 | Downs | |
| 5,852,498 A | 12/1998 | Youvan et al. | |
| 5,872,628 A | 2/1999 | Erskine | |
| 5,889,590 A | 3/1999 | Duggal et al. | |
| 5,891,747 A | 4/1999 | Farah | |
| 5,910,840 A | 6/1999 | Furstenau | |
| 5,923,030 A | 7/1999 | Assard et al. | |
| 5,926,591 A | 7/1999 | Labeye et al. | |
| 5,929,990 A | 7/1999 | Hall | |
| 5,949,801 A | 9/1999 | Tayebati | |
| 5,986,749 A | 11/1999 | Wu et al. | |
| 5,999,261 A | 12/1999 | Pressesky et al. | |
| 5,999,262 A | 12/1999 | Dobschal et al. | |
| 6,016,702 A | 1/2000 | Maron | |
| 6,020,963 A | 2/2000 | DiMarzio | |
| 6,057,911 A | 5/2000 | Reich | |
| 6,064,630 A | 5/2000 | Fersht et al. | |
| 6,069,686 A | 5/2000 | Wang et al. | |
| 6,075,613 A | 6/2000 | Schermer et al. | |
| 6,078,706 A | 6/2000 | Nau et al. | |
| 6,088,144 A | 7/2000 | Doerr | |
| 6,115,521 A | 9/2000 | Tran et al. | |
| 6,118,534 A | 9/2000 | Miller | |
| 6,122,415 A | 9/2000 | Blake | |
| 6,137,621 A | 10/2000 | Wu | |
| 6,151,114 A | 11/2000 | Russell | |
| 6,157,025 A | 12/2000 | Katagiri et al. | |
| 6,173,091 B1 | 1/2001 | Reich | |
| 6,178,001 B1 | 1/2001 | Kim | |
| 6,201,289 B1 | 3/2001 | Jou | |
| 6,212,306 B1 | 4/2001 | Cooper et al. | |
| 6,233,262 B1 | 5/2001 | Mesh et al. | |
| 6,272,926 B1 | 8/2001 | Fehrenbach et al. | |
| 6,281,976 B1 | 8/2001 | Taylor et al. | |
| 6,282,215 B1 | 8/2001 | Zorabedian et al. | |
| 6,289,143 B1 | 9/2001 | Berthold et al. | |
| 6,304,686 B1 | 10/2001 | Yamate et al. | |
| 6,328,647 B1 | 12/2001 | Traudt | |
| 6,330,255 B1 | 12/2001 | Hung | |
| 6,331,892 B1 | 12/2001 | Green | |
| 6,396,605 B1 | 5/2002 | Heflinger et al. | |
| 6,422,084 B1 | 7/2002 | Fernald et al. | |
| 6,425,290 B2 | 7/2002 | Willcox et al. | |
| 6,439,055 B1 | 8/2002 | Maron et al. | |
| 6,469,817 B1 | 10/2002 | Heflinger | |
| 6,486,984 B1 | 11/2002 | Baney et al. | |
| 6,490,038 B1 | 12/2002 | Jung et al. | |
| 6,492,636 B1 | 12/2002 | Chen et al. | |
| 6,492,800 B1 | 12/2002 | Woods et al. | |
| 6,496,265 B1 | 12/2002 | Duncan et al. | |
| 6,501,551 B1 | 12/2002 | Tearney et al. | |
| 6,522,797 B1 | 2/2003 | Siems et al. | |
| 6,538,748 B1 | 3/2003 | Tucker et al. | |
| 6,539,136 B1 | 3/2003 | Dianov et al. | |
| 6,545,760 B1 | 4/2003 | Froggatt et al. | |
| 6,552,799 B1 | 4/2003 | Wright et al. | |
| 6,563,986 B2 | 5/2003 | Davis et al. | |
| 6,581,465 B1 | 6/2003 | Waters et al. | |
| 6,583,882 B2 | 6/2003 | Scruggs et al. | |
| 6,594,022 B1 | 7/2003 | Watterson et al. | |
| 6,597,458 B2 | 7/2003 | Tayag et al. | |
| 6,603,560 B1 | 8/2003 | Islam | |
| 6,608,685 B2 | 8/2003 | Wood et al. | |
| 6,612,174 B2 | 9/2003 | Sittler et al. | |
| 6,621,258 B2 | 9/2003 | Davidson et al. | |
| 6,633,593 B2 | 10/2003 | Ksendzov et al. | |
| 6,636,321 B2 | 10/2003 | Bohnert | |
| 6,643,025 B2 | 11/2003 | Degertekin et al. | |
| 6,647,160 B1 | 11/2003 | Chi et al. | |
| 6,650,420 B2 | 11/2003 | Houston et al. | |
| 6,667,935 B2 | 12/2003 | Vakoc | |
| 6,668,105 B2 | 12/2003 | Chen et al. | |
| 6,668,111 B2 | 12/2003 | Tapalian et al. | |
| 6,668,656 B2 | 12/2003 | Fernald et al. | |
| 6,680,472 B1 | 1/2004 | Thingbø et al. | |
| 6,687,011 B1 | 2/2004 | Lee et al. | |
| 6,687,036 B2 * | 2/2004 | Riza | 359/204 |
| 6,690,873 B2 | 2/2004 | Bendett et al. | |

| | | |
|---|---|---|
| 6,714,566 B1 | 3/2004 | Coldren et al. |
| 6,714,700 B2 | 3/2004 | Burger et al. |
| 6,717,965 B2 | 4/2004 | Hopkins, II et al. |
| 6,735,224 B2 | 5/2004 | Murry et al. |
| 6,741,357 B2 | 5/2004 | Wang et al. |
| 6,747,743 B2 | 6/2004 | Skinner et al. |
| 6,765,194 B2 | 7/2004 | Holz et al. |
| 6,771,905 B1* | 8/2004 | Bortz .................... 398/45 |
| 6,776,049 B2 | 8/2004 | Johnson et al. |
| 6,785,004 B2 | 8/2004 | Kersey et al. |
| 6,791,694 B2 | 9/2004 | Pezeshki |
| 6,798,940 B2 | 9/2004 | Lee et al. |
| 6,806,961 B2 | 10/2004 | Hill |
| 6,820,489 B2 | 11/2004 | Fernald et al. |
| 6,822,979 B2 | 11/2004 | Daiber |
| 6,825,934 B2 | 11/2004 | Baney et al. |
| 6,829,073 B1 | 12/2004 | Krol et al. |
| 6,829,259 B2 | 12/2004 | Pontis et al. |
| 6,838,660 B2 | 1/2005 | Duncan et al. |
| 6,839,131 B2 | 1/2005 | Kwon |
| 6,842,254 B2 | 1/2005 | Van Neste et al. |
| 6,879,421 B2 | 4/2005 | Clark et al. |
| 6,882,428 B2 | 4/2005 | Baney et al. |
| 6,886,365 B2 | 5/2005 | Rumpf et al. |
| 6,886,404 B2 | 5/2005 | Digonnet et al. |
| 6,894,787 B2 | 5/2005 | Youngner et al. |
| 6,898,339 B2 | 5/2005 | Shah et al. |
| 6,900,896 B2 | 5/2005 | Motamedi et al. |
| 6,901,088 B2 | 5/2005 | Li et al. |
| 6,901,176 B2 | 5/2005 | Balachandran et al. |
| 6,904,070 B2 | 6/2005 | Pontis et al. |
| 6,909,548 B2 | 6/2005 | Duggan |
| 6,915,048 B2 | 7/2005 | Kersey et al. |
| 6,917,736 B1 | 7/2005 | Ersoy |
| 6,921,894 B2 | 7/2005 | Swierkowski |
| 6,925,213 B2 | 8/2005 | Boyd et al. |
| 6,940,588 B2 | 9/2005 | Woodside et al. |
| 6,947,218 B2 | 9/2005 | Turner, III |
| 6,955,085 B2 | 10/2005 | Jones et al. |
| 6,963,404 B2 | 11/2005 | Chang |
| 6,985,235 B2 | 1/2006 | Bao et al. |
| 6,989,906 B2 | 1/2006 | Sandercock |
| 7,002,697 B2 | 2/2006 | Domash et al. |
| 7,009,691 B2 | 3/2006 | VanWiggeren et al. |
| 7,016,047 B2 | 3/2006 | May |
| 7,019,837 B2 | 3/2006 | Waagaard |
| 7,043,102 B2 | 5/2006 | Okamoto et al. |
| 7,046,349 B2 | 5/2006 | Everall et al. |
| 7,047,816 B2 | 5/2006 | Jones et al. |
| 7,065,108 B2 | 6/2006 | Park et al. |
| 7,134,346 B2 | 11/2006 | Lopushansky et al. |
| 7,139,081 B2 | 11/2006 | De Groot |
| 7,139,295 B2 | 11/2006 | Tsai et al. |
| 7,173,713 B2 | 2/2007 | Xu et al. |
| 7,230,959 B2 | 6/2007 | Johnson |
| 7,305,158 B2 | 12/2007 | Jeffers et al. |
| 7,405,829 B2 | 7/2008 | Shen |
| 7,423,762 B2 | 9/2008 | Schmidt |
| 7,492,463 B2 | 2/2009 | Lopushansky et al. |
| 7,511,823 B2 | 3/2009 | Schultz et al. |
| 2001/0013934 A1* | 8/2001 | Varnham et al. ............ 356/478 |
| 2001/0048071 A1 | 12/2001 | Holz et al. |
| 2002/0015155 A1 | 2/2002 | Pechstedt et al. |
| 2002/0041722 A1 | 4/2002 | Johnson et al. |
| 2002/0063866 A1 | 5/2002 | Kersey et al. |
| 2002/0109081 A1 | 8/2002 | Tarvin et al. |
| 2002/0167730 A1 | 11/2002 | Needham et al. |
| 2002/0186377 A1 | 12/2002 | Kuskovsky et al. |
| 2002/0191294 A1 | 12/2002 | Duggan |
| 2003/0007522 A1 | 1/2003 | Li et al. |
| 2003/0020926 A1 | 1/2003 | Miron |
| 2003/0025912 A1 | 2/2003 | Hui et al. |
| 2003/0039428 A1 | 2/2003 | Okamoto et al. |

| | | |
|---|---|---|
| 2003/0053069 A1 | 3/2003 | Motamedi et al. |
| 2003/0072009 A1 | 4/2003 | Domash et al. |
| 2003/0076505 A1 | 4/2003 | Bao et al. |
| 2003/0081875 A1 | 5/2003 | Kochergin et al. |
| 2003/0128917 A1 | 7/2003 | Turpin et al. |
| 2003/0132375 A1 | 7/2003 | Blazo |
| 2003/0141440 A1 | 7/2003 | Kim et al. |
| 2003/0142702 A1 | 7/2003 | Pontis et al. |
| 2003/0147067 A1 | 8/2003 | Woodside et al. |
| 2003/0159518 A1 | 8/2003 | Sawatari et al. |
| 2003/0161360 A1 | 8/2003 | Johnson |
| 2003/0184867 A1 | 10/2003 | Clark |
| 2003/0223073 A1 | 12/2003 | VanWiggeren et al. |
| 2003/0231844 A1 | 12/2003 | Kersey et al. |
| 2004/0008742 A1 | 1/2004 | Chou et al. |
| 2004/0013040 A1* | 1/2004 | Maas et al. ................. 367/140 |
| 2004/0013356 A1 | 1/2004 | Wang et al. |
| 2004/0056447 A1 | 3/2004 | Huang |
| 2004/0071383 A1 | 4/2004 | Balachandran et al. |
| 2004/0075841 A1 | 4/2004 | Van Neste et al. |
| 2004/0113104 A1 | 6/2004 | Maida, Jr. |
| 2004/0119981 A1 | 6/2004 | May |
| 2004/0136415 A1 | 7/2004 | Park et al. |
| 2004/0141184 A1 | 7/2004 | Ueki |
| 2004/0151216 A1 | 8/2004 | Tsai et al. |
| 2004/0151438 A1 | 8/2004 | Ferguson |
| 2004/0196874 A1 | 10/2004 | Spiegelberg et al. |
| 2004/0202399 A1 | 10/2004 | Kochergin et al. |
| 2005/0046859 A1 | 3/2005 | Waagaard |
| 2005/0046862 A1 | 3/2005 | Melnyk |
| 2005/0073690 A1 | 4/2005 | Abbink et al. |
| 2005/0105098 A1 | 5/2005 | Johansen et al. |
| 2005/0213870 A1 | 9/2005 | Kersey et al. |
| 2005/0218299 A1 | 10/2005 | Olsen et al. |
| 2005/0231729 A1 | 10/2005 | Lopushansky et al. |
| 2005/0231730 A1 | 10/2005 | Jeffers et al. |
| 2005/0237538 A1 | 10/2005 | Belleville |
| 2005/0241399 A1 | 11/2005 | Lopushansky et al. |
| 2005/0242096 A1 | 11/2005 | Jaghab |
| 2005/0244096 A1 | 11/2005 | Jeffers et al. |
| 2006/0034569 A1 | 2/2006 | Shih et al. |
| 2006/0139652 A1 | 6/2006 | Berthold |
| 2006/0146337 A1 | 7/2006 | Hartog |
| 2006/0152733 A1 | 7/2006 | Waagaard |
| 2006/0241889 A1 | 10/2006 | Lopushansky et al. |
| 2006/0274323 A1 | 12/2006 | Gibler et al. |
| 2007/0006663 A1 | 1/2007 | Zerwekh et al. |
| 2007/0064241 A1 | 3/2007 | Needham |
| 2007/0227252 A1 | 10/2007 | Leitko et al. |
| 2007/0252998 A1 | 11/2007 | Berthold et al. |
| 2008/0043245 A1 | 2/2008 | Needham |
| 2008/0174781 A1 | 7/2008 | Berthold et al. |
| 2008/0186506 A1 | 8/2008 | Lopushansky |
| 2008/0297808 A1 | 12/2008 | Riza et al. |

FOREIGN PATENT DOCUMENTS

| | | |
|---|---|---|
| DE | 3411096 | 6/1983 |
| EP | 0397388 | 11/1990 |
| EP | 0400939 | 12/1990 |
| EP | 0452993 | 10/1991 |
| EP | 0549166 | 6/1993 |
| EP | 571107 | 11/1993 |
| EP | 0597345 | 11/1999 |
| EP | 1586854 | 10/2005 |
| GB | 1168971 | 10/1969 |
| WO | WO-94/28452 | 12/1994 |

OTHER PUBLICATIONS

EP Search Report, Apr. 20, 2007.

Wavelength Multiplexing of Micromechanical System Pressure and Temperature Sensors Using Fiber Bragg Gratings and Arrayed Waveguide Gratings, Li et al, Optical Engineering Feb. 2003, p. 431-438.

Optical Fiber Sensor Technology, Grattan and Meggitt, 2000, pp. 312-313.

Fiber Optic Sensors, Udd, 1991, p. 147.

"Single Mode Fiber Optics", 1983, Jeunhomme, p. 100.

Electronics Letters, vol. 22, No. 21; Oct. 9, 1986; Stevenage, GB; pp. 1097-1099; M. V. Andres et al., "Optical activation of a silicon vibrating sensor".

IEEE Proceedings D. Control Theory & Applications, vol. 135, No. 5; Sep. 1988; Stevenage, GB; pp. 364-368; M. J. Tudor et al., "Silicon resonator sensors: interrogation techniques and characteristics".

Sensors and Actuators, vol. 20, No. 102; Nov. 15, 1989; Lausanne, CH; pp. 143-151; M. W. Putty et al, "Process integration for active polysilican resonant microstructures".

Sensors and Actuators, A., vol. A21-A23, No. 1-3; Feb. 1990; Lausanne, CH; pp. 387-390; R. M. Pitcher et al., "Optothermal drive of silicon resonators: the influence of surface coatings".

Journal of Vacuum Science and Technology: Part A., vol. 8, No. 4; Jul. 1990; New York, US; pp. 3606-3613; D. W. Burns et al., "Thin films for micromechanical sensors".

Optical Engineering, vol. 31, No. 8; Aug. 1992; Bellingham US; pp. 1638-1642; D. Angelidis et al., "Optical micromachined pressure sensor for aerospace application".

IEEE Micro Electro Mechanical Systems Conference, Feb. 7, 1993, Ft. Lauderdale, FL; pp. 230-235; K. Aratani et al., Process and design considerations for surface icromachined beams for a tuneable.

Optical Fiber Sensor Technology, Grattan and Meggit, 2000, pp. 312-313.

Optical Engineering Feb. 2003, p. 431-438, Li et al., Wavelength Multiplexing of Micromechanical System Pressure and Temperature Sensors Using Fiber Bragg Gratings and Arrayed Waveguide Gratings.

Proc. SPIE, vol. 3762,1999, R. L. Johnson, et al. "Miniature Instrument for the Measurement of Gap Thickness Using Polychromatic Interferometry".

IEEE Sensors Journal, vol. 3, No. 6, pp. 812-817, Dec. 2003, Tseng et al. "Polymer MEMS-Based Fabry-Perot Shear Stress Sensor".

Proc. SPIE, vol. 5589, 2004, MacDougall, Trevor W. and Sanders, Paul E., "Large Diameter Waveguide Bragg Grating Components and Their Application in Downhill Oil & Gas Sensing".

Alan D Kersey.; Fiber Grating Sensors; Journal of Lightwave Technology, vol. 15, No. 8, Copyright 1997 IEEE.

J.R. Clowes, et al.; Effects of High Temperature and Pressure on Silica Optical Fiber Sensors; IEEE Photonics Technology Letters, vol. 10, No. 3; Copyright 1998 IEEE.

J.M. Senior; Multiplexing Techniques for Noninterferometric Optical Point-Sensor Networks: A Review, Fiber and Integrated Optics, 17:3-20; Copyright 1998 Taylor & Francis.

Chi Chiu Chan, et al.; Performance Analysis of a Time-Division-Multiplexed Fiber Bragg Grating Sensor Array by Use of a Tunable Laser Source, IEEE Journal of Selected Topics in Quantum Electronics, vol. 6, No. 5; Copyright 2000 IEEE.

* cited by examiner

FIBER OPTIC SENSOR SYSTEM HAVING CIRCULATORS, BRAGG GRATINGS AND COUPLERS

This application claims priority from U.S. Provisional Patent Application Ser. No. 60/637,966, filed Dec. 21, 2004.

FIELD AND BACKGROUND OF THE INVENTION

The present invention is generally related to seismic sensors, and more particularly to fiber optic seismic sensor systems. As used throughout this application and its appended claims, seismic movement and activity can mean any vibrations capable of measurement by a land-based sensor, whether caused by geologic activity, other natural phenomena, explosions, the motion or effects of mechanical implements or any other activity causing vibrations in a land mass.

The traditional method for detecting seismic signals has been the coil-type geophone. Geophone sensors comprise a mass-spring assembly contained in a cartridge about 3 cm long and weighing about 75 grams. In a typical geophone sensor, the spring is soft and as the cartridge case moves the mass (coil) is held in place by its own inertia. Thus, the coil acts as a reference for measurement of the cartridge displacement. This sensor arrangement is used for measurement of large, oscillatory displacements on the order of millimeters with sub-micrometer resolution. The frequency range of these sensors is limited, however. For best sensitivity to small displacements, a given sensor has a mechanical bandwidth of about 10 Hz. Sensors can be designed with center frequencies from 20 Hz to 100 Hz.

Micro-Electro-Mechanical Systems (MEMS) are miniature mechanical components fabricated in silicon wafers. The fabrication methods are based on the same photolithographic and etching processes used to manufacture electronic circuits in silicon. In fact, most MEMS devices include not only miniature mechanical components such as beams, nozzles, gears, etc. but also, integrated electronic components to provide local signal conditioning. Unfortunately, the integrated circuits limit the maximum operating temperature of electronic MEMS to 75° C. The maximum temperature limit can be extended to 400° C. or more if optical fiber sensors are integrated with mechanical MEMS components so that no electronics are needed in the high temperature environment.

Recently, MEMS accelerometers have been developed for 3-component (3C) land seismic measurements. In the MEMS accelerometer, a mass-spring assembly is also used, but unlike the geophone, the spring is stiff and the mass moves with the case that houses the MEMS. The inertia of the mass causes strain and deflection of the spring and the deflection or strain can be measured with a sensor to determine the acceleration. High performance 3C MEMS accelerometers with capacitance sensors have been demonstrated.

The measurement range of accelerometers is specified in units of 'G' where 1G=9.8 m/s$^2$. Commercial specifications include 120 dBV dynamic range (1G to $10^{-6}$ G) and 500 Hz mechanical bandwidth with 24-bit digital resolution equivalent to a noise limited performance of $10^{-7}$G/(Hz)$^{1/2}$. The accelerometer is fabricated on a silicon chip on the order of 100 mm$^2$ and weighing roughly 1 gram. Three single-axis accelerometers (each with an application specific integrated circuit (ASIC) on each chip for signal conditioning) are packaged to measure in three orthogonal directions. The limitation of these accelerometers is an upper limit on the operating temperature of 75° C., which is imposed by the electronic integrated circuits and is not a fundamental limitation of silicon itself.

Additional objects and advantages are set forth in the description which follows, as well as other that may be obvious from the description, known to those skilled in the art or may be learned by practice of the invention.

DESCRIPTION OF THE DRAWINGS

Exemplary objects and advantages, taken together with the operation of at least one embodiment, may be better understood by reference to the following detailed description taken in connection with the following illustrations, wherein.

DETAILED DESCRIPTION

While the present invention is described with reference to the preferred embodiment, it should be clear that the present invention should not be limited to this embodiment. Therefore, the description of the preferred embodiment herein is illustrative of the present invention and should not limit the scope of the invention as claimed.

Reference will now be made in detail to a preferred embodiment illustrated in the accompanying drawings, which illustrate an accelerometer/sensor design and overall system architecture.

The design of the sensor is based on integration of a interferometric fiber optic sensor with a MEMS accelerometer structure. Table 1 below summarizes typical design specifications for an interferometer integrated with MEMS accelerometer. Notably, a Fabry-Perot, two beam or other multiple beam type interferometer can be used in accordance with the invention described herein.

TABLE 1

| | |
|---|---|
| Operating Temperature | 250° C. |
| Resolution | 100 nano-G/(Hz)$^{1/2}$ at 100 Hz |
| Bandwidth (mechanical) | 5 Hz to 500 Hz |
| Dynamic range | 120 dB(V) (60 dB(G)) |
| Other | Measure in three orthogonal axes |

To accommodate the need for an accelerometer with a maximum sensitivity that has a nominal resonant frequency of 100 Hz, two MEMS units can be used on each axis in order to cover a wider G range as well as the mechanical bandwidth requirements, although both the number of units in each axis as well as the number of axes can be altered to suit the desired sensitivity of sensor. Assuming the displacement range for each accelerometer is 1 nm to 1000 nm, the performance characteristics for each MEMS are given in Table 2.

TABLE 2

MEMS design parameters.

| MEMS | G (9.8 m/s2) Max/Min | Displacement Max (nm) | Resonant Frequency | Frequency Range (Hz) |
|---|---|---|---|---|
| A | $1/10^{-4}$ | 1,000 | 140 | 5-500 |
| B | $10^{-3}/10^{-6}$ | 1,000 | 50 | 5-250 |

Figure 1A:
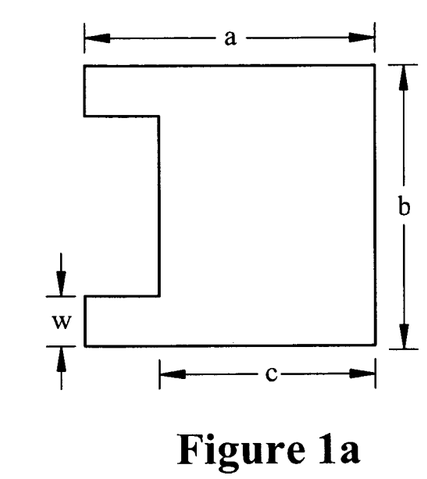
FIG. 1a is a top-view diagrammatical representation of a MEMS cantilever which can be integrated within a silicon wafer, a frame or a combination thereof.
Figure 1B:
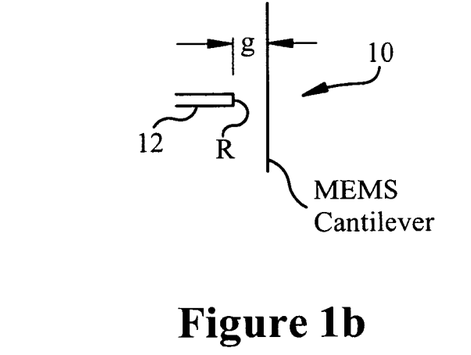
FIG. 1b is a partial side-view representation of the interface between the MEMS cantilever and the optical fiber.

A diagram of the MEMS cantilever is shown in FIGS. 1*a* and 1*b*, while representative dimensions are provided below in Table 3. With this particular arrangement, the frequency response falls off below $10^{-4}$G, although further improvements to the response can be engineered.

With reference to FIG. 1*a*, which is a top view of cantilever 10, and FIG. 1*b*, which is a side view of cantilever 10, optical fiber 12 delivers light to an end of the cantilever 10. The end of the fiber has a partially reflective coating labeled R, as does the silicon cantilever, so as to define an interferometer cavity (as mentioned above) where the reflectors are spaced apart by gap distance labeled g. As g changes, changes in the relative phase of the light reflected from the end of the fiber and the cantilever produce changes in light interference that modulate the total light signal reflected back into the fiber.

Understanding that the cantilever 10 will be mechanically coupled to the MEMS unit which houses the interferometer, the position of the fiber 12 relative to the cantilever 10 (that itself defines the gap distance g) should be selected so as to maximize sensitivity to vibrations of the cantilever 10. For the ease of construction and stability during operation, it may be preferable to etch the cantilever onto a planar wafer such that the "leg" portions (shown in FIG. 1*a* as having a width 'w') are attached to a larger assembly or frame, thereby imparting a U-shape to the cantilever. Other shapes providing one or more anchor points may also be possible, including but not limited to an E-shape, a Y-shape and the like. Also, if the cantilever is constructed from silicon or some other at least partially reflective material, the cantilever does not necessarily need to have reflective coating deposited thereon (although use of a non-reflective coating, a reflective coating, a partially transmissive coating or any combination thereof, whether on the interior or exterior of the cantilever, may be used to add further precision). Clearly, ease of manufacture for the cantilever can be achieved by constructing the cantilever from silicon, silicon carbide or other materials commonly used in MEMS devices.

Table 3 lists the MEMS dimensions when the cantilevers have a preferred uniform thickness of 25 μm. Note that the information below corresponds to the reference lines indicated in FIG. 1*a*.

TABLE 3

| MEMS | a (mm) | b (mm) | c (mm) | w (mm) |
|---|---|---|---|---|
| A | 4 | 4 | 3 | 0.1 |
| B | 8 | 4 | 2 | 0.1 |

Figure 2:
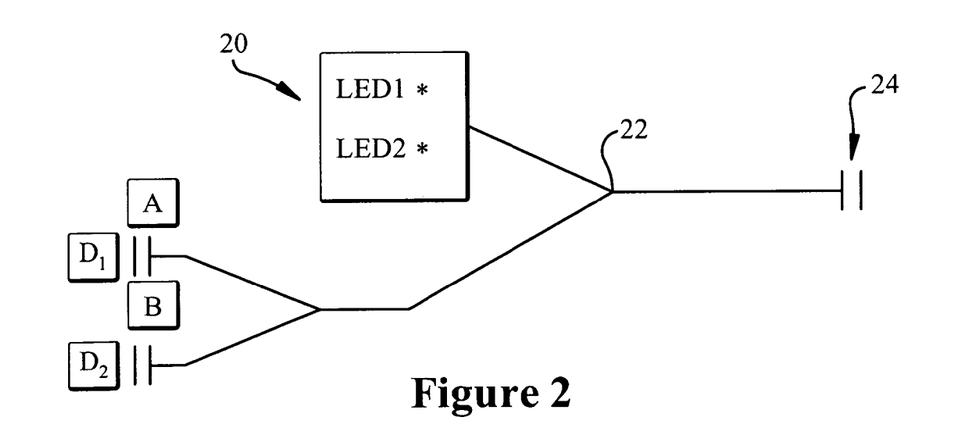
FIG. 2 is a schematic representation of a basic optoelectronic signal processor.

A preferred optoelectronic signal processor schematic for the invention is shown in FIG. 2. This processor is designed to provide input to software so as to monitor the signals from the MEMS units.

The signal processor is designed to read out the gap from an interferometric sensor, such as a Fabry-Perot, two-beam or other multiple beam interferometric sensor, that has a nominal 150 μm long gap. Larger or smaller gaps are possible through appropriate modifications. As shown in FIG. 2, the optoelectronic signal processor 20 includes two light sources LED1, LED2, such as an LED (light emitting diode) or ASE (amplified spontaneous emission). Light sources LED1, LED2 have a bandwidth of at least 50 nm. Light from the sources LED1, LED2 passes through a 2×1 coupler 22 to the Fabry-Perot sensor 24 in the MEMS accelerometer (not shown). At the sensor, the light is modulated by the small changes in the length of the sensor gap as the MEMS vibrates. Use of the cantilever 10 described above enhances response to the vibrations which are to be measured. Modulated light reflected from the sensor 24 returns and is split and projected through two optical cross-correlators A, B each of which has a different and preferably adjustable thickness. For example, the cross correlators A, B may consist of two partially reflective surfaces with gaps that can be varied by an actuator. Other arrangements for the signal processor are also possible, and further information on such suitable optoelectronic processors can be found in U.S. patent application Ser. Nos. 11/048, 521; 11/105,671; and 11/106,750, which are all assigned to the same assignee as this application and all of which incorporated by reference herein.

In operation, the difference in thickness of the cross correlators A, B varies to match the sensor 24. When the cross correlators are properly adjusted, the thickness directly in front of the detectors is approximately equal to the gap monitored by sensor 24 so that the difference between the cross correlator thicknesses is approximately λ/8, where λ is the center wavelength of the light source emission. As indicated by the sine curves in FIG. 3 (which themselves represent signal response for processor 20), the cross correlator thickness difference of λ/8 ensures that for any gap, the two signals from the two photodiodes are 90° out of phase with each other and within a few microns of the actual sensor gap.

The detectors are InGaAs photodiodes to match the light sources. For long-range applications, i.e., where the light passing through the processor 20 traverses more than 1000 meters, sources in the C-band (1500 to 1600 nm) are needed where optical fiber losses are low. The source may be either and LED or ASE, although adjustments to account for such loses may allow the use of other sources. The output of one of the photodiode detectors, i.e., photodiode D1, is designated the measurement signal and the other photodiode output, i.e., photodiode D2, is designated the tracking signal. The measurement signal proportional to the gap in sensor 24 is amplified in the signal processor and this amplified signal is the processor analog output. The tracking signal is used to control the actuator to maintain the measurement signal on the point of maximum slope of one of the interference fringes shown in FIG. 3.

Figure 3:
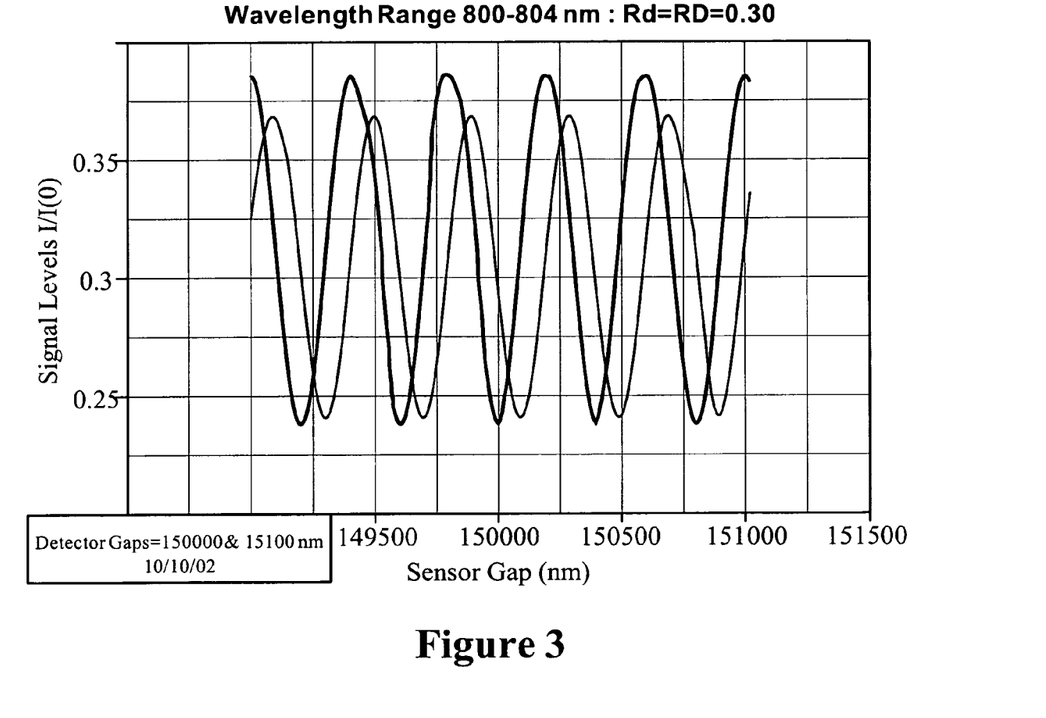
FIG. 3 is a graphical representation of the signal level versus gap when the source wavelength is near 1500 nm, source bandwidth is 4 nm, and the sensor gap is 150 μm.

The actuators in cross correlators A, B may be stepper motors or other suitable actuators such as lead-zirconate-titanate PZT crystals that change the gaps of the two cross correlators A and B through a relatively large range, e.g., 20 μm. The separation of the cross correlator gaps A and B is set so that the modulated signal shown in FIG. 3 is centered about the sensor gap (150 μm in this example) and on the point of maximum slope of the interference fringe. Each cross correlator may be mounted in a frame with a bearing assembly attached to the shaft of a stepper motor to enable the cross correlator gaps to be changed. If two PZT actuators are used instead of stepper motors, the cross correlator gap is defined by an optical fiber spaced away from a moving reflector attached to the PZT actuator. As in the sensor assembly, the end of the fiber is covered by a partially reflective coating.

The LED or ASE sources may be selected to have center wavelengths at 1520 nm and 1580 nm to cover the entire band 1500 nm to 1600 nm. With high brightness sources, the average spectral power per unit wavelength interval is greater than 5 µW/nm, which is sufficient for the application. Such an ASE or LED pair can excite 24 MEMS units, although other possible sources (with differing brightness and wavelengths) may be possible.

In terms of the overall layout of the sensor system, twelve ASE or LED pairs and twelve optical fibers are required to monitor 144 MEMS units which, keeping in mind more than one MEMS may be needed in each of three axes, would be necessary to achieve a preferred sensitivity for the system. A cable to service 144 MEMS units would contain 12 optical fibers. A thirteenth fiber may be provided to service 24 temperature sensors to monitor the thermal environment of the accelerometers and cable. Notably, such temperature sensors can be implemented to improve the overall performance of the system. So as to be compatible with the preferred light sources identified above, all optical fibers may be single mode in the C-band (for example, core diameter 9 µm and clad diameter 125 µm), although other appropriate types may be used.

Figure 4:
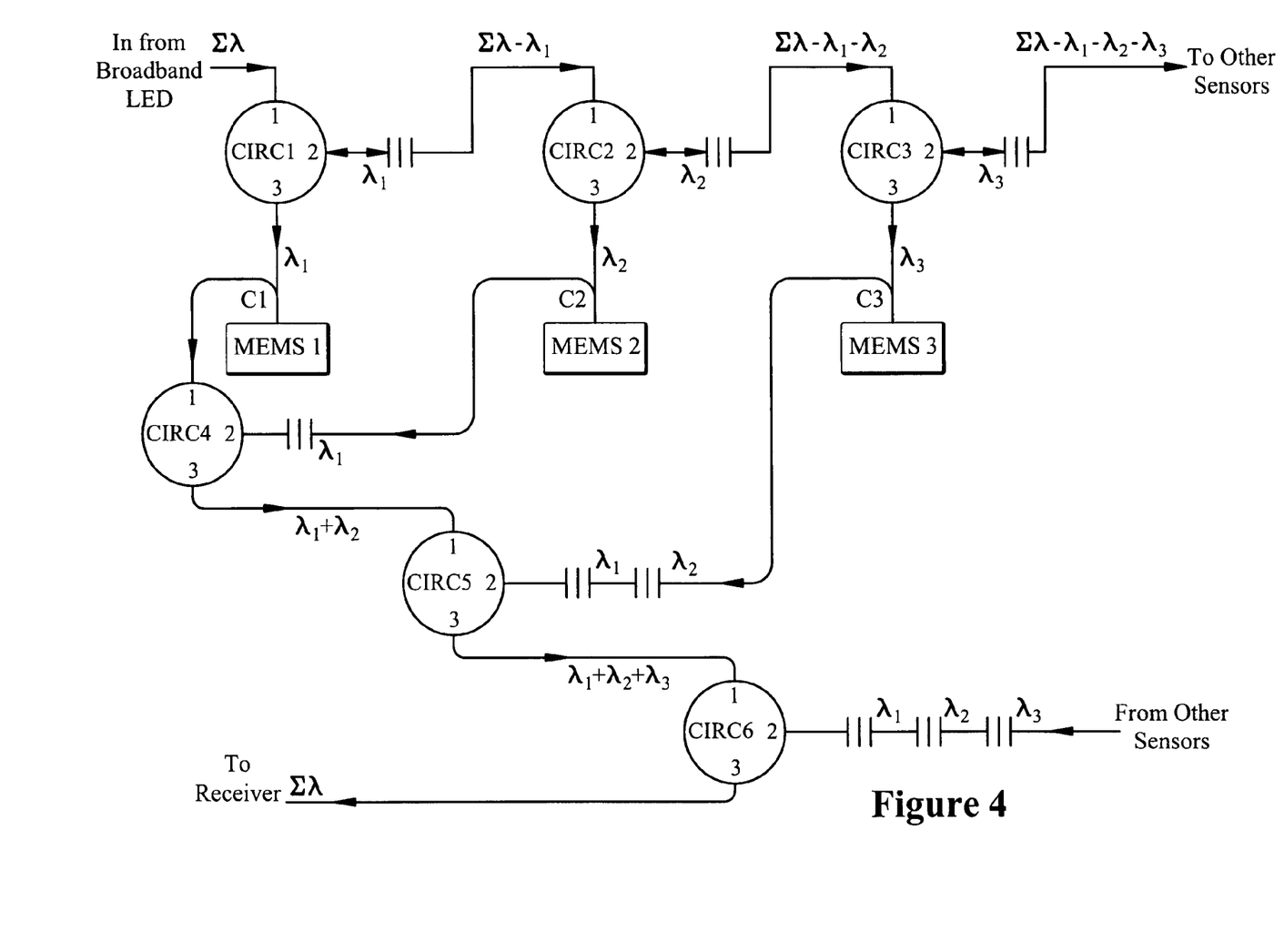
FIG. 4 is a diagrammatical representation of the system architecture for three MEMS accelerometer units, although this representation may be easily modified to accommodate additional MEMS accelerometer units.

A diagram of one possible embodiment for the overall system architecture is shown in FIG. 4. A group of three MEMS units is shown, however multiple MEMS are preferred to achieve appropriate sensitivity for a seismic sensor. Depending upon the desired sensitivity, it may be possible to adjust the overall number of MEMS.

A measurement station is defined as a location where a three-axis vibration measurement is to be performed, thereby requiring cantilever/sensor combinations in each of these axes. Thus, to illustrate according to the principles set forth in the preferred embodiment above, a pair of fibers and two LEDs can service 24 MEMS units, and there would be six MEMS units per station. Twenty-four stations require 144 MEMS units. Wavelengths labeled λ1, λ2, and λ3 represent wavelength bands 3-4 nm wide. Thus, 24 MEMS span 96 nm that is approximately equal to the wavelength band 1500-1600 nm of the two combined LEDs.

FIG. 4 depicts such an arrangement. The MEMS accelerometer units MEMS1, MEMS2, MEMS3 are single ended devices, each preferably having a Fabry-Perot gap as described above, and the MEMS are provided light via an optical fiber. 3 dB power splitters C1, C2, C3 and circulators CIRC1-CIRC6 are also provided. Generally speaking as to the operation of all circulators shown, light entering port 1 of a circulator exits port 2. Light entering port 2 exits port 3 so that a single light source can service multiple circulators (i.e., CIRC1-CIRC3). Bragg gratings λ1, λ2, λ3 reflect specific wavelength bands to each MEMS unit. Modulated light from each MEMS unit reenters circulators CIRC4-CIRC6 at port 2 and is coupled back into a separate output fiber that transmits the multiplexed signals to the receiver at ground level outside the well. In the receiver, a similar arrangement of circulators and Bragg gratings demultiplexes the wavelength bands and sends each band to an optoelectronic signal conditioner as contemplated in FIG. 2.

The output of the two detectors D1, D2 is a pair of phase shifted signals (e.g., quadrature signals 90° out of phase or other suitable signal pairs). As explained earlier, the signals are electronically demodulated to obtain the time varying signal from each MEMS accelerometer. The time varying signals may in turn be sent to a spectrum analyzer to record frequency and amplitude information over the 500 Hz spectral range of each MEMS accelerometer unit.

The embodiment above provides integration of a silicon MEMS cantilever beam accelerometer with an interferometric fiber optic sensor with sufficient sensitivity and range for use in land seismic applications. Further, the maximum temperature limit of the accelerometers is 400° C. or more since optical fiber is integrated with mechanical MEMS components. Finally, no electronics are needed in the high temperature environment.

Alternative embodiments for the optoelectronic signal processor to those shown in FIGS. 2 and 3 are possible according to the teachings herein, and this application and its appended claims expressly embrace such alternatives.

While the embodiments described herein and the invention identified should find particular applicability in detecting seismic movements as defined above, the apparatus and method can be used to detect changes to any number of environmental parameters which create small movements or vibrations. By way of example rather than limitation, the sensor and method described herein could be used to detect changes in pressure, temperature and the like.

I claim:

1. A fiber optic sensor system comprising:
a source of light;
a first MEMS device that modulates a first specific wavelength of light directed from the source of light by a first circulator and first Bragg grating, said first MEMS device having a first interferometer and a first cantilever;
a second MEMS device that modulates a second specific wavelength of light directed from the source of light by the first circulator, the first Bragg grating, a second circulator, and a second Bragg grating, the second MEMS device having a second interferometer and a second cantilever;
an optoelectronic processor which receives the modulated light from the first and second MEMS devices and produces a signal indicative of an environmental parameter;
a third circulator, a fourth circulator, and a fifth circulator interposed between the first MEMS device and the optoelectronic processor and the third circulator, the fourth circulator, and the fifth circulator interposed between the second MEMS device and the optoelectronic processor;
and means for delivering the light between the light source, the MEMS devices, the circulators, the Bragg gratings, and the optoelectronic processor.

2. The system according to claim 1, wherein at least one of the first and second cantilevers are constructed from silicon or silicon carbide.

3. The system according to claim 1, wherein the first and second cantilevers each have a shaped selected from the group consisting of: U, E and Y.

4. The system according to claim 1, wherein the first and second cantilevers are each framed within a planar silicon wafer.

5. The system according to claim 1, wherein the optoelectronic processor comprises a cross correlator.

6. The system according to claim 5, wherein the cross correlator includes a controllably variable gap.

7. The system according to claim 1, wherein the means for delivering the light comprises at least one optical fiber.

8. The system according to claim 1, wherein the first and second interferometers are each selected from the group consisting of: a Fabry-Perot interferometer, a two beam interferometer and a multiple beam interferometer.

9. The system according to claim 1, wherein the light has a wavelength band between 1500-1600 nm.

10. The system according to claim 1, wherein the environmental parameter is selected from the group consisting of: seismic activity, temperature and pressure.

11. The system according to claim 1, further comprising a third MEMS device that modulates a third specific wavelength of light directed from the source of light by the first circulator, the first Bragg grating, the second circulator, the second Bragg grating, a sixth circulator, and a third Bragg grating, the third MEMS device having a third interferometer and a third cantilever; and wherein the fourth and fifth circulators are interposed between the third MEMS device and the optoelectronic processor.

12. The system according to claim 11 wherein the first, second and third MEMS devices are arranged to measure vibration in three separate orthogonal axes.

13. The system according to claim 1 wherein the first and second MEMS devices are both arranged to measure vibration in a single orthogonal axis.

14. A fiber optic sensor system comprising:
1) a broadband light source;
2) a plurality of sensor units, each sensor unit having a MEMS accelerometer structure and an integrated fiber optic interferometer, the plurality of sensor units including:
   a) a first sensor unit for modulating a first unique wavelength of light directed from the light source by a first circulator and a first Bragg grating;
   b) a second sensor unit for modulating a second unique wavelength of light directed from the light source by the first circulator, the first Bragg grating, a second circulator, and a second Bragg grating; and
   c) a third sensor unit for modulating a third unique wavelength of light directed from the light source by the first circulator, the first Bragg grating, the second circulator, the second Bragg grating, a third circulator and a third Bragg grating;
3) an optoelectronic processor which receives the modulated light from the first, second and third sensor units and produces a signal indicative of an environmental parameter;
4) a fourth, fifth and sixth circulators, wherein:
   a) the fourth, fifth and sixth circulators are interposed between the first and second sensor units and the optoelectronic processor; and
   b) the fifth and sixth circulators are interposed between the third MEMS unit and the optoelectronic processor; and
5) means for delivering light between the light source, the MEMS units, the circulators, the Bragg gratings, and the optoelectronic processor.

15. The system according to claim 14 wherein the first, second and third sensor units are for measuring vibration along separate orthogonal axes.

16. The system according to claim 14 wherein at least two of the sensor units are for measuring vibration along a single axis.

17. The system according to claim 14 further comprising fourth, fifth and sixth sensor units, the system having two sensor units for measuring vibration along each of the orthogonal axes.

18. The system according to claim 14 wherein at least one of the MEMS accelerometer structures includes a cantilever.

19. The system according to claim 14 wherein the optoelectronic processor comprises a cross correlator.

20. The system according to claim 14 wherein the means for delivering light includes at least one optical fiber.

* * * * *